United States Patent [19]

Eisenzimmer

[11] Patent Number: 4,854,031

[45] Date of Patent: Aug. 8, 1989

[54] HOSE CRIMPER AND METHOD OF USING SAME

[75] Inventor: George W. Eisenzimmer, Akron, Ohio

[73] Assignee: The Goodyear Tire & Rubber Company, Akron, Ohio

[21] Appl. No.: 307,906

[22] Filed: Feb. 9, 1989

[51] Int. Cl.[4] .................... B21D 39/00; B23P 11/00; B23P 19/04

[52] U.S. Cl. .................................... 29/508; 29/516; 29/237; 72/402

[58] Field of Search ................ 29/516, 508, 237, 517; 72/402, 416

[56] References Cited

U.S. PATENT DOCUMENTS

| | | | |
|---|---|---|---|
| 3,455,140 | 7/1969 | Galan et al. | 72/416 |
| 3,695,087 | 10/1972 | Tuberman | 72/402 |
| 3,744,114 | 7/1973 | Melsom | 29/237 |
| 3,792,603 | 2/1974 | Orain | 72/402 |
| 3,823,597 | 7/1974 | Hanback et al. | 29/237 |
| 3,848,451 | 11/1974 | Allin | 29/237 X |
| 3,924,440 | 12/1975 | Vinje | 29/237 X |
| 4,276,765 | 7/1981 | Yoneda | 72/452 |
| 4,304,116 | 12/1981 | Velarde | 72/402 X |
| 4,339,940 | 7/1982 | MacKay et al. | 72/402 |
| 4,515,006 | 5/1985 | Stanley | 72/402 |
| 4,535,689 | 8/1985 | Putkowski | 100/214 |
| 4,550,587 | 11/1985 | Eisenzimmer | 74/402 |
| 4,703,546 | 11/1987 | Gilbert | 29/157.1 R |

*Primary Examiner*—Charlie T. Moon

*Attorney, Agent, or Firm*—Frederick K. Lacher; T. P. Lewandowski

[57] ABSTRACT

A die supporting ring member (67) is removably supported in an opening (20) of a surrounding frame (12). Pusher members (24,26) are positioned around the die supporting ring member (67) with sloping surfaces (28,30) in engagement with the circumferentially spaced dies (72) in the ring member (67). The sloping surfaces (28,30) are also engageable with sloped surfaces (32,34) in the frame opening (20). A piston and cylinder assembly (38) is mounted on the frame (12) for moving the pusher members (24,26) toward one side of the opening (20) causing them to slide along the sloping surfaces (32,34) in the frame opening (20) and move the dies (72) radially inward to crimp a tubular fitting positioned within the die supporting ring member (67).

13 Claims, 4 Drawing Sheets

HOSE CRIMPER AND METHOD OF USING SAME

This invention relates to a crimping apparatus for compressing a tubular fitting against the exterior of another cylindrical member such as a hose. Hose crimpers have been provided heretofore with a crimping head having a conical hole. The surface of the conical hole was in engagement with the circumferentially spaced dies and moved the dies radially as the head was moved vertically. Other similar clamping apparatus has included a pair of frames supporting pusher and jaw members between the frames and providing limited clamping forces by the jaw members upon movement of the frames together. Forming apparatus for a metal clip has also been proposed with pusher members engaging the dies and being moved by two piston and cylinder assemblies but with no sloped surfaces on the frame. Another clamping apparatus for a mold has been proposed in which wedging action is provided by two pusher blocks moving in opposite directions along one side of a frame opening in which the mold is located causing movement of a pusher member against the side of the mold.

Heretofore hose crimpers have had a generally fixed configuration and did not have the flexibility for operation in different positions. The hose crimper of this invention has a relatively flat configuration and can be pivotally mounted for horizontal and vertical operation as well as operation at an angle. Only one piston and cylinder assembly for actuating the crimper is required. The crimper also accommodates interchangeable dies of different size and the dies and pusher members provide a range of diameters while maintaining a perfect circle during crimping.

In accordance with one aspect of this invention there is provided a hose crimper for radially compressing a sleeve against an exterior of a hose, comprising a frame having an opening for positioning the hose with the sleeve thereon, a die pusher assembly mounted in the opening, the die pusher assembly including more than two crimping segments mounted for radial movement into engagement with the sleeve, at least one of the crimping segments being in engagement with a pusher member in the opening, the pusher member having a sloping surface in sliding engagement with a sloped surface of the frame in the opening for moving the pusher member toward the sleeve on the exterior of the hose upon movement of the pusher member toward one side of the opening and power means in engagement with the pusher member for exerting pressure on the pusher member causing movement of the pusher member toward the one side of the opening.

In accordance with another aspect of the invention there is provided a method of crimping a sleeve on a hose with crimping segments positioned in an opening of a frame wherein a die pusher assembly is mounted in the opening and the die pusher assembly includes more than two crimping segments mounted for radial movement into engagement with the sleeve, at least one of the crimping segments being in engagement with a pusher member positioned in the opening, the pusher member having a sloping surface in sliding engagement with a sloped surface of the frame in the opening comprising moving the pusher member toward the sleeve by moving the pusher member toward one side of the opening causing movement of the pusher member toward the one side of the opening.

To acquaint persons skilled in the arts most closely related to the present invention, a certain preferred embodiment thereof illustrating a best mode now contemplated for putting the invention into practice is described herein by and with reference to the annexed drawings forming a part of the specification. The embodiment shown and described herein is illustrative and as will become apparent to those skilled in these arts can be modified in numerous ways within the spirit and scope of the invention defined in the claims hereof.

Figure 1:
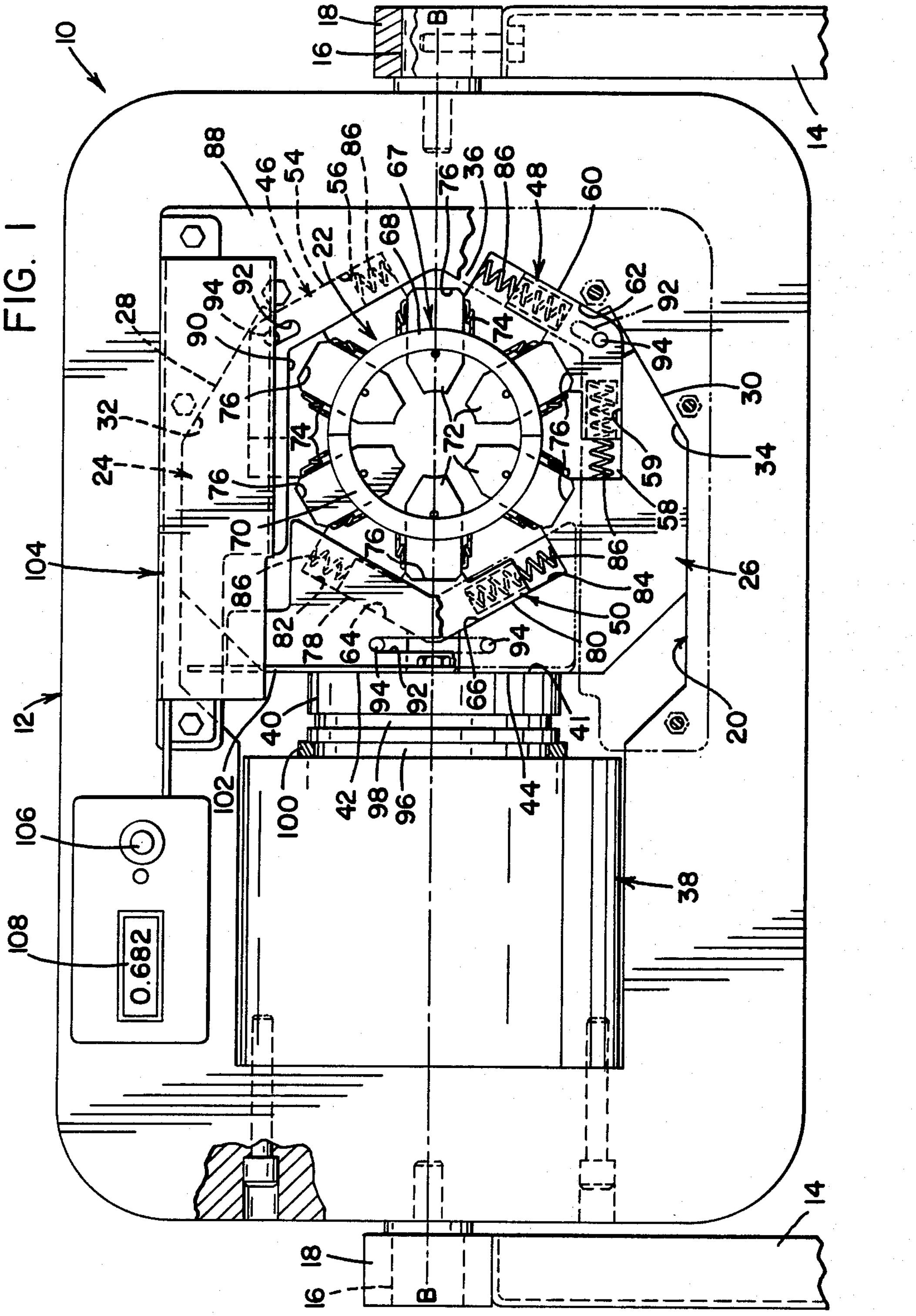
FIG. 1 is a side elevation of a hose crimping apparatus embodying the invention with parts being broken away showing the pusher members and dies in the open position of the apparatus.
Figure 3:
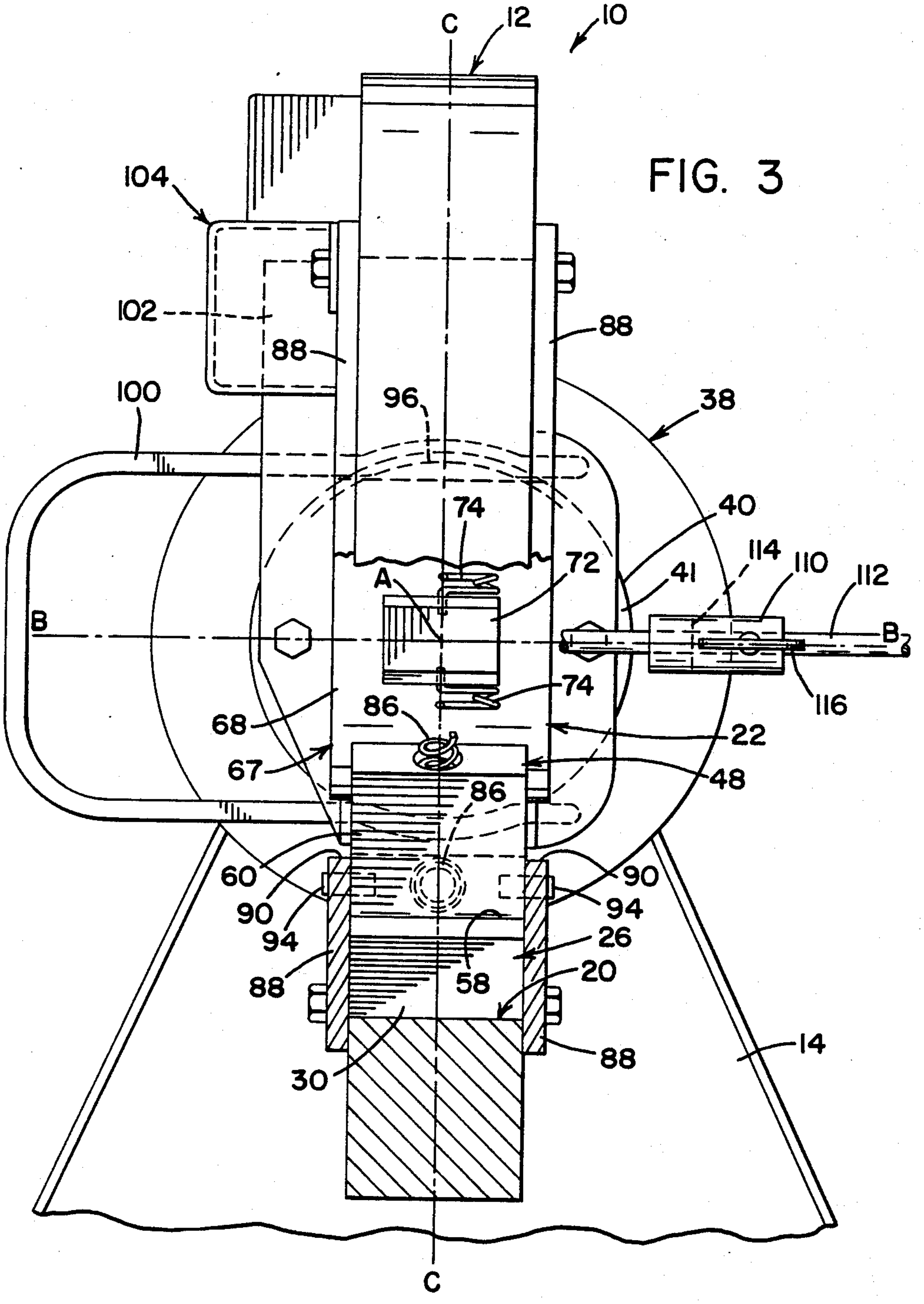
FIG. 3 is an enlarged right end view with parts being broken away.
Figure 4:
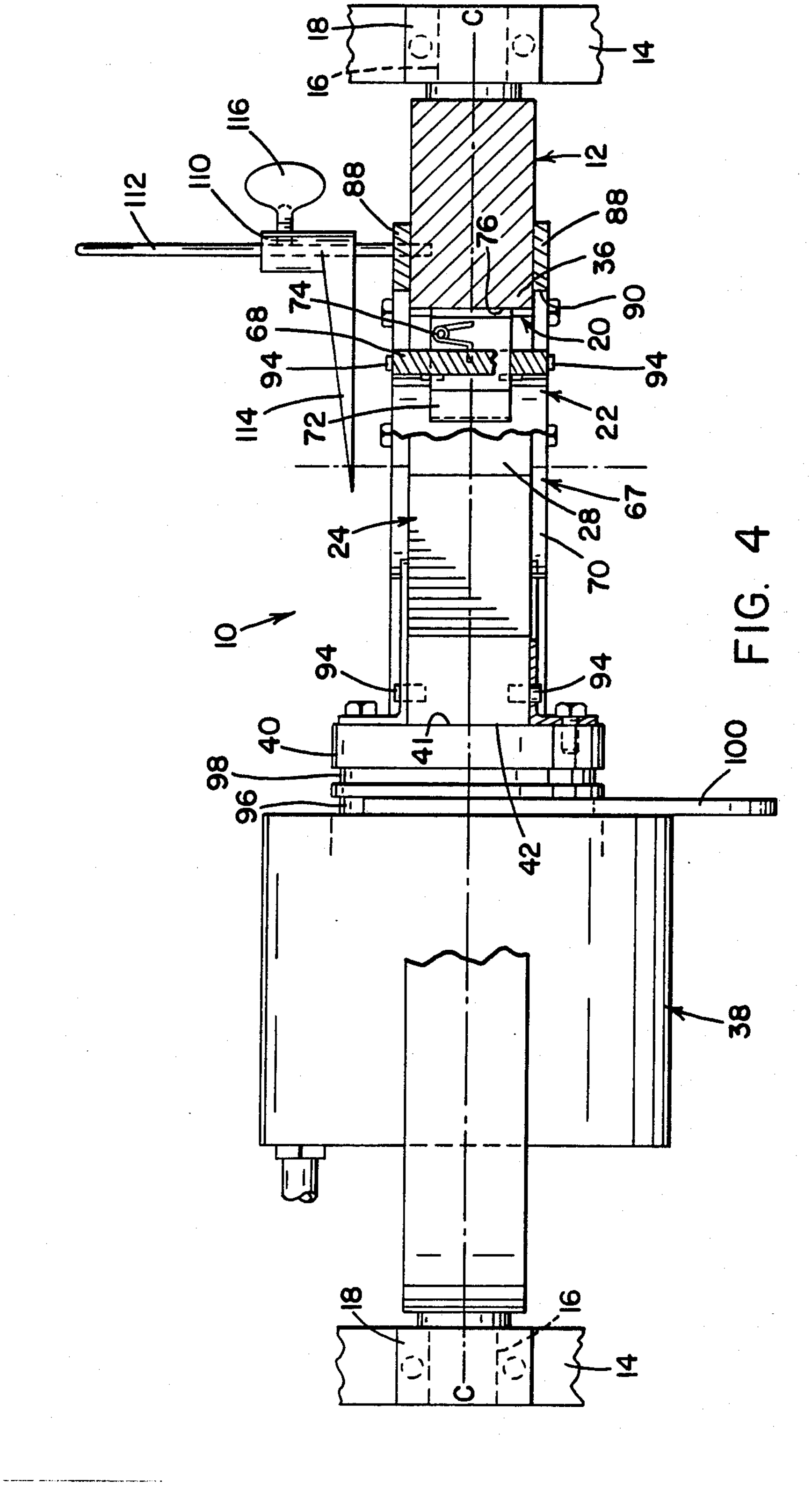
FIG. 4 is a plan view with parts being broken away.

Referring to FIGS. 1, 3 and 4, a hose crimper 10 is shown having a frame 12 pivotally mounted about a rotational axis A—A on a stand 14. Pivot bearings 16 fastened to the ends of the frame 12 are mounted in pivot blocks 18 fastened to the frame. Preferably the frame 12 is a single block of high strength material such as steel and has an opening 20 which may be cut out of the center of the frame. The frame 12 may be made out of several frame members bolted or welded together if desired. A die pusher assembly 22 is positioned within the opening 20 and includes a first pusher member 24 and a second pusher member 26 having sloping surfaces 28 and 30, respectively, for sliding engagement with sloped surfaces 32 and 34, respectively, on the frame 12. The die pusher assembly 22 is positioned in the opening 20 at a die pusher side 36 of the opening 20 at one end of the frame 12. A piston and cylinder assembly 38 is mounted at the other end of the opening 20 and has a piston 40 with a sliding surface 41 in engagement with power transmitting surfaces 42 and 44, respectively, of the first pusher member 24 and second pusher member 26.

Positioned between the first pusher member 24, second pusher member 26 and the die pusher side 36 of the opening 20 is a first riding pusher 46, second riding pusher 48 and third riding pusher 50. The first riding pusher 46 is slidably supported in a forward recess 52 at an inner surface 53 of the first pusher member 24 and has a sloping surface 54 in sliding engagement with a first riding pusher surface 56 in the die pusher side 36 of the opening 20. The second riding pusher 48 is slidably mounted in a forward recess 58 at the inner surface 59 of the second pusher member 26 and has a sloping surface 60 in sliding engagement with a second riding pusher surface 62 in the die pusher side 36 of the opening 20. The third riding pusher 50 is positioned in rearward recesses 64 and 66 of pusher members 24 and 26, respectively.

Located within the pusher members 24 and 26 and the riding pushers 46, 48 and 50 is a ring member 67 having two semicircular cages 68 and 70 for supporting crimping segments such as dies 72. Springs 74 connect the cages 68 and 70 and the dies 72 to hold the dies in the cages and return the dies to the retracted condition in engagement with die seats 76. Moving clockwise from the die seat 76 in the first riding pusher 46, as shown in FIG. 1, there are die seats in the second riding pusher 48, the second pusher member 26, the third riding pusher 50, and the first pusher member 24.

Figure 2:
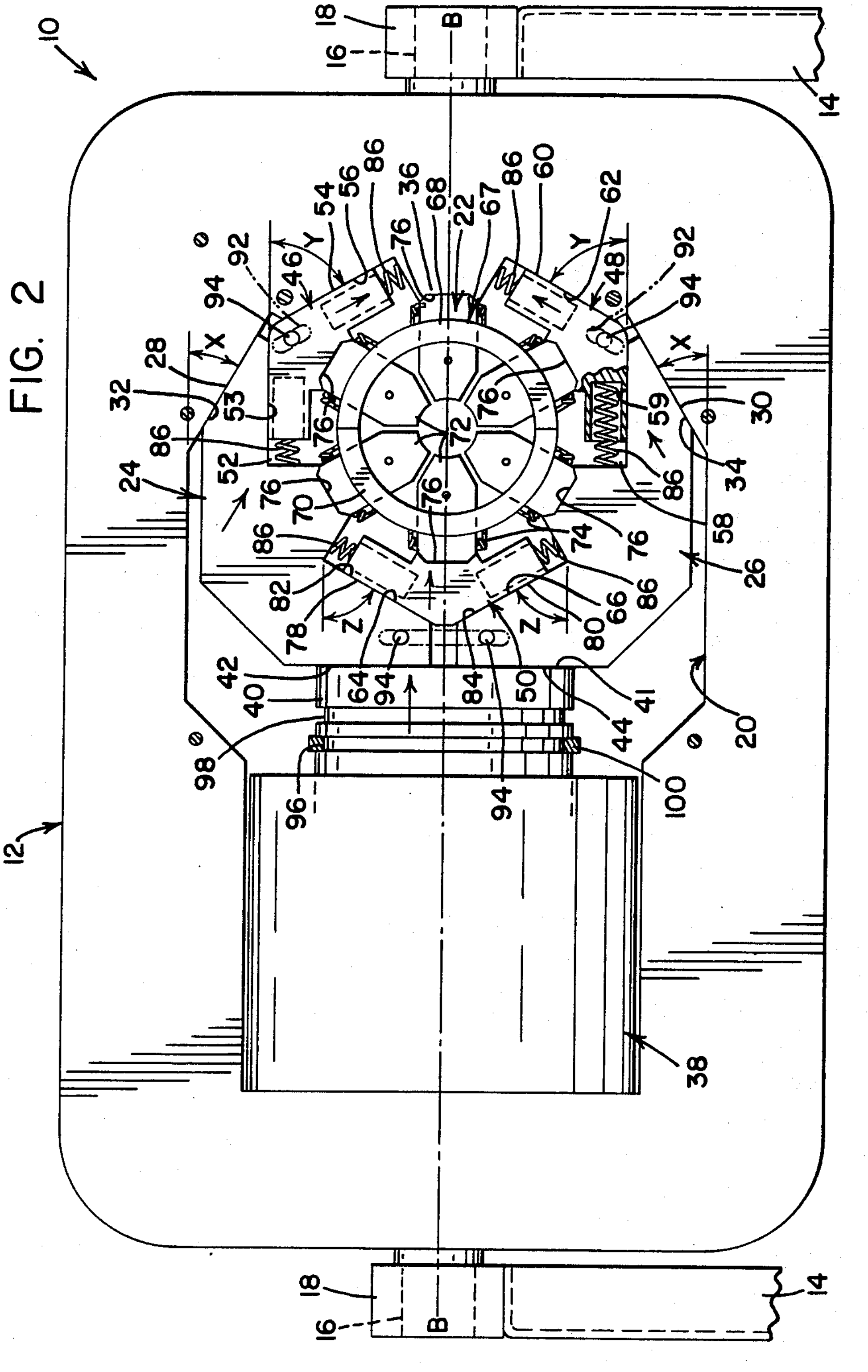
FIG. 2 is a view similar to FIG. 1 with parts removed showing the pusher members and dies in the closed position.

Referring to FIG. 2, it will be seen that when the piston and cylinder assembly 38 is actuated and the piston 40 is moved to the right, the first pusher member 24 and second pusher member 26 will be moved to the right and the sloping surfaces 28 and 30 will slide along the sloped surfaces 32 and 34 in the frame 12 causing the first pusher member and second pusher member to move together. This movement of the first pusher member 24 and second pusher member 26 causes the first riding pusher 46 and the second riding pusher 48 to move to the right with the first riding pusher surface 56 sliding along the sloping surface 54 and the second riding pusher surface 62 sliding along the sloping surface 60. Simultaneously the third riding pusher 50 is moved to the right causing the dies 72 to be moved inwardly in a perfectly contracting circle to crimp a sleeve against the exterior surface of a hose (not shown). When this hose crimper 10 is assembled, the following sliding surfaces are lubricated with a suitable high pressure lubricant, the sloping surfaces 28 and 30 of pusher members 24 and 26, the sloped surfaces 32 and 34 in frame opening 20, the sloping surfaces 54 and 60 of the first and second riding pushers 46 and 48, the first riding pusher surface 56 and second riding pusher surface 62 in the opening 20, the sliding surface 41 of piston 40 and power transmitting surfaces 42 and 44 of pusher members 24 and 26, the inner surface 53 of the first pusher member 24 and the inner surface 59 of the second pusher member 26.

As shown in FIG. 2, the sloped surfaces 32 and 34 on the frame 12 and the sloping surfaces 28 and 30 on the first pusher member 24 and second pusher member 26 are at an angle X of 30 degrees to a plane parallel to a central plane C—C perpendicular to a plane B—B containing the dies 72 and extending through the rotational axis A—A of the frame 12. The sloping surfaces 54 and 60 and the first riding pusher surface 56 and second riding pusher surface 62 are at an angle Y of 60 degrees to a plane parallel to the central plane C—C. The third riding pushers 50 have sloping surfaces 78 and 80 in sliding engagement with third riding pusher surfaces 82 and 84 of the first pusher member 24 and second pusher member 26, respectively. The sloping surfaces 78 and 80 and the third riding pusher surfaces 82 and 84 are at angle Z of 60 degrees to a plane parallel to the central plane C—C. With these surfaces at angles X, Y and Z, a perfect circle is maintained as the dies 72 are contracted by the movement of the pusher members 24 and 26 and the riding pushers 46, 48 and 50.

As shown in FIG. 1, return coil springs 86 are positioned at the ends of the riding pushers 46, 48 and 50 to return the riding pushers to the open position when the piston 40 is retracted. The springs 74 attached to the dies 72 also return the dies to the open position.

Plate members such as frame guards 88 are bolted on each face of the frame 12 and overlap the opening 20 so as to hold the pusher members 24 and 26 and the riding pushers 46, 48 and 50 in the opening. The frame guards 88 have openings 90 to permit sliding the cages 68 and 70 into the space within the die pusher assembly 22. Slots 92 in the frame guards 88 are provided to accommodate roll pins 94 attached to the first riding pusher 46, second riding pusher 48 and third riding pusher 50 to hold the riding pushers in the opening 20 upon removal of the cages 68, 70 and dies 72.

The piston 40 has generally circumferential grooves 96 and 98 in which a bail 100 may be resiliently positioned to limit the movement of the piston and thereby reduce the time necessary for the crimping operation. The bail 100 may be removed to permit full retraction of the piston 40 along with one of the die cages 70 to insert odd size fittings. The bail 100 may also be moved from the groove 96 to the groove 98 to provide greater movement of the piston 40 where desired.

Hydraulic fluid for the piston and cylinder assembly 38 is supplied from a suitable source of hydraulic pressure such as a hydraulic pump (not shown) and, in the present embodiment, the piston and cylinder assembly 38 comprises a 100-ton ram. A spring in the cylinder of the piston and cylinder assembly 38 returns the piston 40 to the retracted position. Control of the distance that the piston 40 is moved to the right, as shown in FIG. 1, is provided by a stop means which, in the present embodiment, includes a riding guard 102 mounted on the piston and extending to a position in engagement with a suitable controller 104 which can be set by a knob 106 on the controller to indicate the distance the piston may be moved on a dial 108.

A hose positioning stop 110 may be mounted on one of the frame guards 88 to position the hose. The stop 110 has a rod 112 and a bar 114 slidably mounted on the rod with a thumbscrew 116 for clamping the bar at desired positions.

With the pivotal mounting of the frame 12, the hose crimper 10 can be positioned with the dies 72 in a horizontal plane so that two-piece fittings can be crimped. Suitable means such as friction bearings or a positive lock device may be used to hold the frame 12 in the horizontal plane or other planes containing the rotational axis A—A ,for convenience of operation.

While a certain representative embodiment and details have been shown for the purpose of illustrating the invention, it will be apparent to those skilled in the art that various changes and modifications may be made therein without departing from the spirit or scope of the invention.

What is claimed is:

1. A hose crimper for radially compressing a sleeve against an exterior of a hose, comprising a frame having an opening for positioning said hose with said sleeve thereon, a die pusher assembly mounted in said opening, said die pusher assembly including more than two crimping segments mounted for radial movement into engagement with said sleeve, at least one of said crimping segments being in engagement with a pusher member in said opening, said pusher member having a sloping surface in sliding engagement with a sloped surface of said frame in said opening for moving said pusher member toward said sleeve on the exterior of said hose to drive said at lest one of said crimping segments into engagement therewith to crimp said sleeve into said hose upon movement of said pusher member transversely toward one side of said opening into sliding engagement with said sloped surface on said frame and power means in engagement with said pusher member for exerting pressure on said pusher member causing movement of said pusher member toward said one side of said opening.

2. A hose crimper according to claim 1 wherein said frame is a block of high strength material.

3. A hose crimper according to claim 1 wherein said power means includes a hydraulic cylinder mounted on said frame at a location in said opening opposite said one side of said opening and a piston in said cylinder in engagement with said pusher member.

4. A hose crimper according to claim 1 wherein one of said crimping segments is in engagement with said first-mentioned pusher member and another of said crimping segments is in engagement with a second pusher member, said first-mentioned pusher member being in side-by-side relation to said second pusher member and said second pusher member and said first-mentioned pusher member being in engagement with said power means for simultaneous movement of said first-mentioned pusher member and said second pusher member to move said crimping segments toward said sleeve.

5. A hose crimper according to claim 4 wherein said power means includes a hydraulic cylinder mounted on said frame at a location opposite said one side of said opening and a piston in said cylinder in engagement with said first-mentioned pusher member and said second pusher member.

6. A hose crimper according to claim 4 including riding pushers interposed between said first-mentioned pusher member and one of said crimping segments and said second pusher member and one of said crimping segments, each of said riding pushers having a surface for sliding engagement with a surface on said first-mentioned pusher member or said second pusher member and resilient means between said riding pushers and said first-mentioned pusher member and said second pusher member to urge said first-mentioned pusher member and said second pusher member in a direction away from said one side of said opening whereby said crimping segments are moved away from said sleeve in said opening upon release of pressure on said first-mentioned pusher member and said second pusher member by said power means.

7. A hose crimper according to claim 6 wherein at least one of said riding pushers has a pusher sloping surface for engagement with a frame sloped surface in said opening whereby upon movement of said riding pushers at least one of said crimping segments is moved radially toward and away from said sleeve.

8. A hose crimper according to claim 3 wherein said piston has removable stop means for limiting the return movement of said piston into said cylinder when in engagement with said piston and for permitting increased movement of said piston into said cylinder when said stop means is removed from said piston to provide clearance for inserting different size fittings.

9. The hose crimper of claim 1 wherein said crimping segments are supported in at least two supporting cages for mounting in said opening.

10. The hose crimper of claim 1 wherein at least one of said crimping segments is positioned for engagement with said frame at said one side of said opening.

11. A hose crimper according to claim 1 wherein said frame is pivotally mounted on a stand about a rotational axis for operation with said crimping segments in a horizontal plane or other plane containing said rotational axis.

12. A hose crimper according to claim 7 wherein said sloped surfaces of said frame and said sloping surfaces of said pusher members are positioned at an angle of 30 degrees to a plane parallel to a central plane perpendicular to a plane containing said crimping segments and extending through said rotational axis of said frame, and said pusher sloping surfaces and said frame sloped surfaces being positioned at an angle of 60 degrees to said plane parallel to said central plane.

13. A method of crimping a sleeve on a hose with crimping segments positioned in an opening of a frame wherein a die pusher assembly is mounted in said opening and said die pusher assembly includes more than two crimping segments mounted for radial movement into engagement with said sleeve, at least one of said crimping segments being in engagement with a pusher member positioned in said opening, said pusher member having a sloping surface in sliding engagement with a sloped surface of said frame in said opening comprising moving said pusher member toward said sleeve to drive said at least one of said crimping segments into engagement therewith to crimp said sleeve into said hose by moving said pusher member transversely toward one side of said opening into sliding engagement with said sloped surface on said frame causing movement of said pusher member toward said one side of said sleeve.

* * * * *